United States Patent
Kelly (10) Patent No.: US 7,131,613 B2
(45) Date of Patent: Nov. 7, 2006

(54) HIGH-ALTITUDE LAUNCHING OF ROCKETS LIFTED BY HELIUM DEVICES AND PLATFORMS WITH ROTATABLE WINGS

(75) Inventor: Patrick D. Kelly, St. Louis, MO (US)

(73) Assignee: Tetraheed LLC, St. Louis, MO (US)

( * ) Notice: Subject to any disclaimer, the term of this patent is extended or adjusted under 35 U.S.C. 154(b) by 6 days.

(21) Appl. No.: 10/692,057

(22) Filed: Oct. 23, 2003

(65) Prior Publication Data

US 2005/0116091 A1 Jun. 2, 2005

(51) Int. Cl.
*B64C 39/02* (2006.01)
(52) U.S. Cl. .................. 244/171.4; 244/2; 244/63; 244/127; 244/25
(58) Field of Classification Search ............. 244/171.4, 244/96, 97, 127, 128, 2, 172, 63, 30, 25, 244/26
See application file for complete search history.

(56) References Cited

U.S. PATENT DOCUMENTS

| | | | | |
|---|---|---|---|---|
| 990,897 | A | * | 5/1911 | Newbury ...................... 244/26 |
| 1,228,159 | A | * | 5/1917 | Ziperstein et al. ............. 244/25 |
| 1,561,696 | A | * | 11/1925 | Covert ........................... 244/2 |
| 1,608,822 | A | * | 11/1926 | Silver ............................ 244/25 |
| 1,633,238 | A | * | 6/1927 | Bassett ......................... 244/97 |
| 1,726,062 | A | * | 8/1929 | Gilman ......................... 244/48 |
| 5,823,468 | A | * | 10/1998 | Bothe .............................. 244/2 |
| 6,068,211 | A | * | 5/2000 | Toliver et al. .................... 244/2 |

OTHER PUBLICATIONS

JP Aerspace Flight, John Powell, May 25, 1999 (5 pages).*

Ansari X Prize Team Summary Sheet, American Scaled Composites Team, www.xprize.org/teams/teams.php.
Ansari X Prize Team Summary Sheet, DaVinchi Project Team, www.davinciproject.com.
JP Aerospace, "ATO Airship to Orbit: Cheap, Bulk, Safe Access to Space", www.jpaerospace.com.
"Rockoons" entry, from *Encyclopedia Astronautica*, www.astronautix.com/lvs/rockoon.htm.
Sarigul-Klijn, M., et al, "Flight mechanics of manned sub-orbital reusable launch vehicles with recommendations for launch and recovery," American Institute of Aeronautics and Astronautics publn. 2003-0909 (2003).
Transformational Space Corporation, LLC, "CVX Earth-to-Orbit System", www.transformspace.com.

* cited by examiner

*Primary Examiner*—Galen Barefoot
(74) *Attorney, Agent, or Firm*—Patrick D. Kelly

(57) ABSTRACT

A system is disclosed for lifting a rocket into the upper atmosphere and establishing forward flight at several hundred miles per hour, before the rocket engines are ignited and the rocket is released from the lifting system. The main subassemblies of this lifting system comprise:

(1) an array of large helium-filled dirigibles, of a size that can provide hundreds or thousands of tons of lifting force;
(2) a tank-holding assembly that will be tethered to the dirigibles, and that will contain pumps and high-pressure tanks, to recapture and store the helium for use in subsequent launches; and,
(3) a winged platform, with wings that can be rotated vertically during liftoff, and horizontally to establish forward flight after a desired altitude has been reached, and having conventional aircraft engines on each wing.

This system enables safer, less expensive, and more efficient launching of rockets and heavy payloads into space, using easily reusable subassemblies.

6 Claims, 2 Drawing Sheets

HIGH-ALTITUDE LAUNCHING OF ROCKETS LIFTED BY HELIUM DEVICES AND PLATFORMS WITH ROTATABLE WINGS

RELATED APPLICATION

This application claims priority based on U.S. provisional application 60/420,270, filed on Oct. 22, 2002.

FIELD OF THE INVENTION

This invention is in the field of rocketry and aerospace engineering, and relates to systems for lifting fully-loaded rockets to high altitudes, and giving them substantial forward speed, before their rocket engines are ignited.

BACKGROUND OF THE INVENTION

The current method for launching rockets, from a stationary position on a fixed launch pad resting on the ground, is highly inefficient, and requires large, bulky, and very expensive rockets to lift a payload into orbit. A typical large rocket usually can lift, into orbit, a total payload that weights only about 1 to 3% of the total weight of the fully-loaded rocket. As an example, Saturn V rockets, used to launch the Apollo missions to the moon, weighed roughly 6.2 million pounds when loaded, but they could lift only 285,000 pounds into orbit, and could deliver only 107,000 lb to the moon.

In addition, the basic design of rockets places a large and tall column of very heavy material, on top of a small horizontal cross-section. Using the Saturn V again as an example, it was more than 360 feet tall, but its diameter was only 33 feet. This type of very tall column requires very strong and heavy structural members, especially near the bottom of the column, to prevent structural failures.

The heavy stresses and pressures that are imposed on tall rockets become even greater, during the accelerations that are generated during a launch. These stresses and strains render rockets more susceptible to failure, and demands very careful maintenance and fairly extensive replacement of parts, between every launch. It is no coincidence that both of the space shuttles that have been lost to date (the Challenger, which exploded during liftoff in 1986, and the Columbia, which disintegrated during reentry in 2003 due to damage it suffered during liftoff) were lost due to failures that occurred during liftoff. An analysis of all rocket losses and failures that have occurred, during the entire U.S. space program, very likely would reveal that well over 90% of all rocket failures occur during liftoff.

The unavoidable limitations, risks, and shortcomings of the conventional methods of launching rockets are well-known to aerospace engineers, the National Aeronautics and Space Administration (NASA), and any person or company with a serious level of interest in space flight. Therefore, the shortcomings of the current methods for launching rockets will not be described in further detail herein, except in direct comparison to the substantially different approach of the lifting and launching system disclosed herein.

The remainder of this Background section will briefly summarize a completely different type of rocket-lifting system, which is designed to lift rockets to high altitudes, in a horizontal position, and get them flying forward at hundreds of miles per hour, before the rocket engines are ignited. This Background section will then point out a number of features and aspects of this system that offer advantages over conventional rocket launching systems. Each such feature must be evaluated, not in isolation, but by comparing it to the current system of launching rockets.

Figure 1:
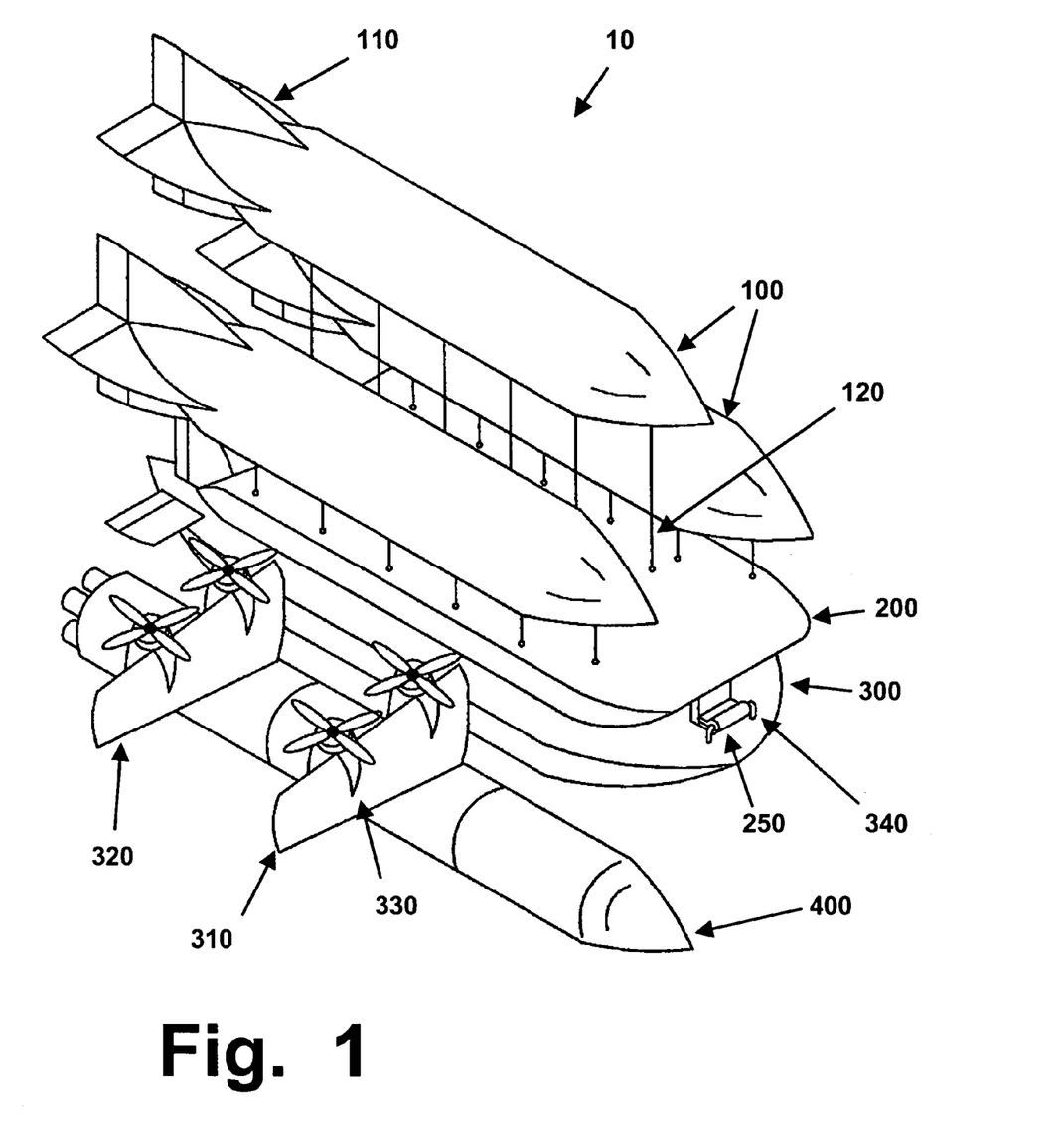
FIG. 1 is a perspective view of a lifting and launch assembly, with an array of three helium-filled dirigibles tethered to a tank-holding platform, and with the wings on the winged platform oriented vertically for maximum lifting force.

Briefly, the rocket lifting and launching system disclosed herein is illustrated in FIG. 1, and can be regarded as comprising four main subassemblies, or layers. At the very top of the complete system 10 is an array of large helium-filled vessels, shown as dirigibles 100 in FIG. 1, with lengths that preferably should be in a range of about 300 to 1000 feet, to allow them to provide hundreds or even thousands of tons of lifting capacity. Beneath the dirigibles 100 is a tank-holding unit 200, which can also be referred to by terms such as "lifting barge". It will hold high-pressure tanks and pumps, so that the dirigibles can be deflated by pumping the helium into the tanks, after the system has reached a high altitude and the rocket is almost ready to be released. Beneath the tank-holding unit 200 is a device referred to herein as "winged platform" 300. It will have multiple wings, each of which will be provided with multiple engines of a type used in conventional airplanes, having oversized propellers. The fourth subassembly is rocket 400, which is suspended horizontally beneath the winged platform 300.

Figure 2:
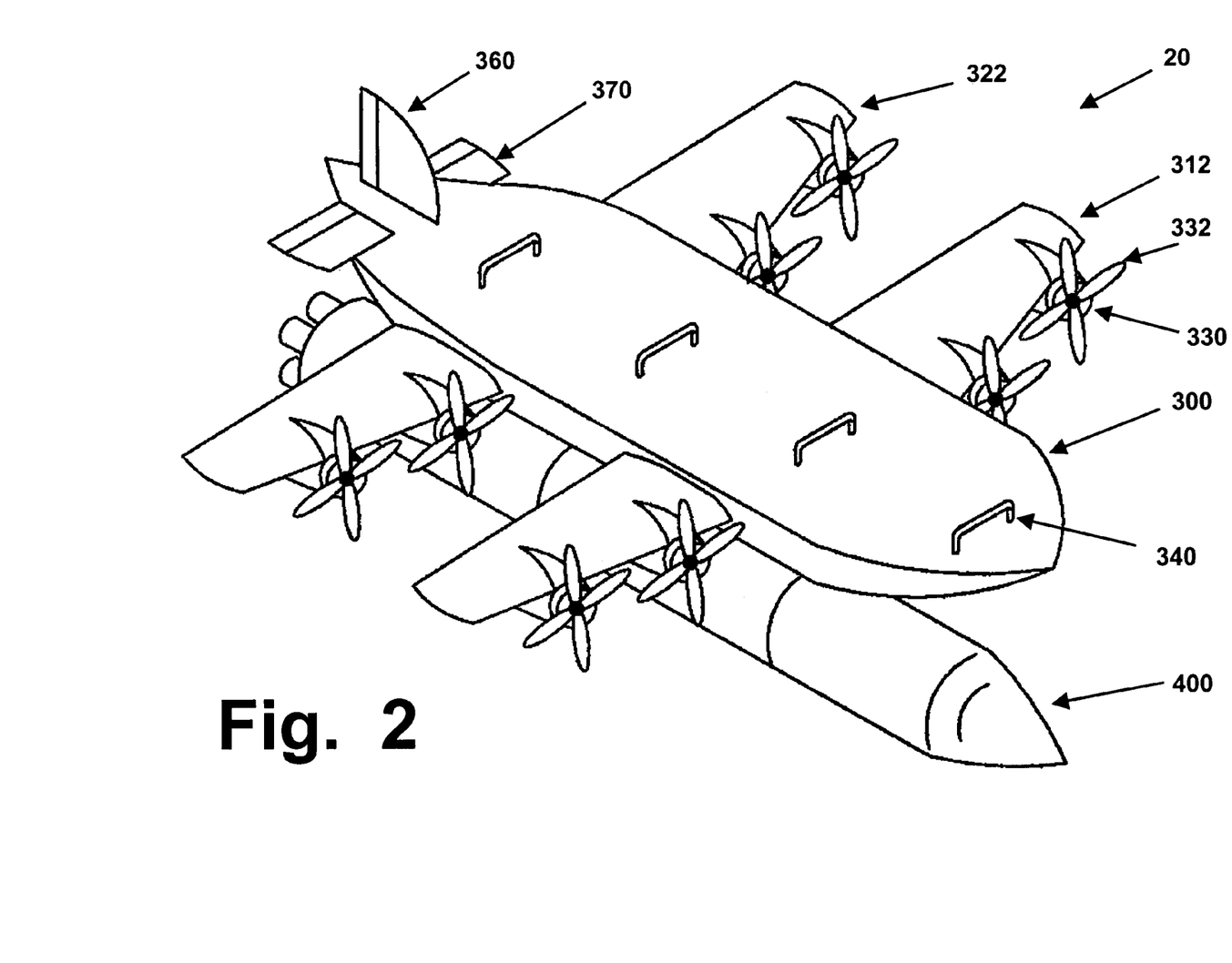
FIG. 2 is a perspective view of a winged platform with a rocket suspended beneath it, after the dirigibles and tank-holding platform have been detached. The wings on the flying platform have been rotated to a horizontal position, to establish forward flight before the rocket engines are ignited.

The wings on the "winged platform" 300 will be rotatable, in a manner comparable to Osprey airplanes as used by the U.S. military, or Harrier jets as used by the British military. During liftoff, these wings will be rotated into a vertical position, as shown in FIG. 1, so that the propellers will provide maximum vertical lift, comparable to helicopters. After the system reaches a desired altitude, the wings will be rotated partially forward, as shown in FIG. 2, to begin providing horizontal propulsion and forward flight. As the system picks up speed, the dirigibles will be deflated, to reduce their drag. When the rotation of the wings and the deflation of the dirigibles reach a suitable combination, the winged platform 300 will be released and dropped by the tank holder 200 and dirigibles 100. After this release, the platform 300 and rocket 400 will be able to reach a flying speed of several hundred miles per hour, still without burning any rocket fuel. When the system has been checked out and is ready, the rocket engines will be ignited, presumably for an initial low-power burn that will allow confirmation that all systems are functioning properly. If everything is working properly, the rocket 400 will be released by the platform 300, and when the rocket has flown a safe distance from the platform, the rocket engines will be increased to full power.

Accordingly, this system can allow rockets (including large and heavy rockets) to be lifted to at least 10,000 meters (roughly 30,000 feet) or higher, and then given a flying speed of hundreds of miles per hour, before any rocket fuel must be burned to carry the rocket and its payload into orbit.

Once the arrangement and operation of this multi-part lifting and launching system is understood, a number of advantages, compared to conventional rocket launching devices and methods, will begin to become clear, including the following.

First, this approach will allow a rocket having a fixed size (such as an already-existing, well-known class of rocket that has an extensive record of successful use and experience) to carry a substantially larger and heavier payload into space, compared to a rocket of the same size when launched from a stationery position, sitting on the ground.

In a second related advantage, this system will allow much more efficient launches, and more efficient use of rocket fuel. While conventional rockets can boost only about 1 to 3 percent of their total weight into orbit as a payload, the lifting system disclosed herein is likely to at least triple or quadruple that efficiency level, to levels of greater than 10 percent.

Third, this approach can provide a rocket launching system that can be used much more frequently, and with less refurbishing and lower expense, than the space shuttle or any other currently known system. Most of the components of the lifting system will be straightforward adaptations of well-known types of dirigibles and large cargo airplanes. This will allow simple and rapid refurbishing between missions, consisting mainly of refueling.

Fourth, by providing a system that suspends a rocket horizontally while it is being lifted, this system will distribute the weight of the rocket over a fairly long linear span, rather than stacking a huge and tall column of heavy material on top of a small area, as occurs in conventional rocket launches. In this manner, this new lifting system can greatly reduce the intensity and severity of pressures and stresses that are imposed on the lower levels of a rocket. By reducing the intensity of the pressures and stresses generated during liftoff, this can make launches safer and more controllable, as well as less prone to vibrations and other undesired motions. Accordingly, it can allow the frame and the other components that are used to enclose and support the tanks, engines, piping, and other internal parts of the rocket, to be made of lighter, more efficient, less expensive materials.

Fifth, this type of slow-lifting system can be monitored and extensively controlled, during each and all of the sequential steps of a lifting and launching operation. This type of monitoring and responsive controlling can be carried out by pilots who fly on board the system, while it rises slowly to the desired altitude; alternately, it can be carried out by completely unmanned remote controls, using telemetry. This will allow safer operations, and if a major malfunction arises, it will offer various ways, not available in conventional rocket launches, to terminate or abort a launch, and bring the entire system (or some portion of it) back down, in a controlled descent, so it can be landed safely (such as on or near a large recovery vessel, floating in the ocean).

And finally, because of several aspects of how this system is designed, and how it will function, this new and different approach to launching rockets may be able to help create and provide an important step forward, to help the nations, cultures, and religions of the world begin working together much more cooperatively toward exploring and colonizing the moon, then Mars, and eventually other planets.

A patent application is not the proper forum for an inventor to engage in rhetoric or social commentary; however, readers are asked and urged to at least consider the visual, social, and international implications of this type of lifting and launching system, compared to conventional rocket launchings. Because of historical and funding factors, rockets and missiles were developed as highly dangerous and destructive weapons. Everything about them was designed to provide maximum thrust, force, speed, and destructive power. Even in times of peace, they're closely tied to military uses, and are widely regarded as generally threatening, by anyone who does not live in the nation that launched a new type of rocket (as an example, even when they do not carry outright weaponry into space, they quite often carry spy satellites, military hardware, or other payloads that are designed to advance the interests of the launching nation, rather than the general interests of all humanity). Even if developed for uses that are ostensibly peaceful, they can be quickly modified to deliver extremely destructive "warheads".

If anyone in the U.S. does not quickly recognize the threatening implications of how rockets and missiles are designed and launched today, he or she should simply ponder the fears, concerns, and threats that are felt, when nations that are openly hostile to America (and/or to their neighbors) take active and aggressive steps to obtain and test ever-larger rockets. No one feels reassured when some country that is not a safe and reliable ally decides to create and test bigger, larger, and faster rockets.

By contrast, the systems disclosed herein are not suited at all for aggressive or threatening use. Since they will rise very slowly, in ways that cannot be hidden from surveillance, they would offer fat, slow, easy targets to defensive weaponry, if a neighboring country or continent feels threatened.

Instead, these lifting and launching systems are specifically and intentionally designed to lift large, bulky, heavy loads, of the type that will be necessary to build permanent manned colonies on the moon, Mars, and elsewhere.

Since the suitable and natural focus, goal, and image of slow-lifting rocket launchers can and should be for entirely peaceful and humanitarian purposes (such as for building permanent colonies on the moon or Mars), these systems offer a remarkable and potentially powerful opportunity for the nations, cultures, and religions of the world to (i) adopt safeguards against their use for aggressive or threatening purposes, and (ii) begin developing ways for the nations, cultures, and religions of the world, to cooperate with each other, while designing and then building peaceful, cooperative, coexisting colonies on the moon or Mars.

As just one example, if the leaders of the great religions of the world were to begin a process of drafting agreements and understandings that among themselves, to help establish a framework for different religions and their followers to coexist and cooperate peacefully, while building a collection of colonies on the moon in which faith and belief would be obliged to find ways to coexist with science and technology, that type of effort may be able to do a great deal of good, not just in the lunar colonies that would result, but here on earth as well.

In addition, it should be recognized that the launching systems of this invention can be adapted to be launched from a much wider range of locations, on earth, than can be achieved by conventional rocket launches. In general, the various components of this system can be flown or otherwise transported to nearly any hospitable location in the world, and then launched from that location without requiring an onland facility that would cost hundreds of millions of dollars to construct and operate. Accordingly, this type of relatively mobile system could be used to enable any cooperating country to actually conduct and witness the launching of a major rocket, with an important payload, and with a manned crew if desired.

A patent application is not the proper forum for an extended discussion of issues that go beyond the machinery and technology disclosed therein. Nevertheless, anyone who seriously ponders this invention, and who ponders what it might do to help accelerate and enable the actual construction of permanent colonies on the moon and Mars, should realize that the planning and designing of permanent colonies in space will raise important and unavoidable questions relating to faith, religions, and international relations. The Applicant herein has done what he can, as a scientist/engineer who is also an attorney and a patent attorney (and with help from a number of helpful and trusted advisors having a range of different backgrounds), to try to begin developing and offering a framework for analysis and constructive discussion of such issues. That framework has been posted on an Internet website, www.tetraheed.net, in a set of web pages and downloadable essays.

As a brief introduction and summary, in one set of web pages, the Applicant points out how a complex three-dimensional object can look quite different, from different perspectives. As one example, the top, front, and side views of a building often look quite different from each other; and yet, all three of those "orthogonal" views can be accurate and helpful, in helping someone figure out what the building actually looks like. Accordingly, one of the goals of education should be to teach people how to view and evaluate anything complex from at least three substantially different viewpoints, and then construct their own mental image and understanding of that item, in ways that accurately and honestly incorporate elements from all three of perspectives. This concept and approach is embodied in the name "Tetraheed", which in turn arose from the name "tetrahedron", which is the most stable three-dimensional building block found in nature.

Additional web pages (with downloadable essays) address a number of conflicts between science and religion, focusing on evolution as one example of an ongoing battle between them. The Applicant proposes a middle ground, which accepts both science and religion (while posing serious unresolved questions for each), in a manner comparable to accepting that men and women must find ways to get along and work together despite their differences, and which attempts to promote a process of wrestling usefully and constructively with the conflicts that will arise, when leaders begin to seriously ask how competing and often conflicting (and even warring) national and religious interests should be handled, in newly-formed colonies that will be built in space.

The viewpoints expressed in those web pages and essays are not incorporated herein, and they stand independently of this invention, which rests on scientific, engineering, and technical factors and insights. Nevertheless, anyone who is interested in the social, religious, and other non-technical aspects of colonizing space is requested to browse the Tetraheed website and at least consider the comments therein.

Finally, it also should be noted that the same Applicant herein has filed a utility patent application on another set of machines that can help enable and accelerate the actual construction of permanent inhabited colonies, on the moon and eventually Mars. Because of the overlap of that invention with this invention, the contents of that second application are incorporated herein by reference, as though fully set forth herein.

Very briefly, that separate invention relates to the staged and sequential construction and testing of prototype machines, each of which will be able to carry out one specific and limited type of operation on the moon, using the powdery mineral dust (called "regolith") that covers the surface of the moon. The first set of machines will crawl (on tractor treads or similar devices) across the surface of the moon, scooping up the powdery regolith, and smelting it into ingots of processed metal. These machines would start at an initial location, and crawl across the lunar surface, most likely in a generally spiral pattern, scooping up the dust and depositing a series of smelted ingots along their trails.

A second set of machines would follow in those trails, and would scoop up the ingots, and process them into plates or pipes.

A third set of machines would do similar operations, to create photovoltaic wafers, ribbons, or other devices that will generate voltage, when hit by sunlight.

A fourth set of machines would do similar operations to create battery cores, for storing electricity.

By using this approach, a set of unmanned machines that would not risk any human lives can be designed, and tested in prototype form. If launched and used, these machines can begin creating stockpiles of extremely useful building materials on the moon, in selected locations (such as at the lunar north or south pole, where constant sunlight and line-of-sight contact with earth are always available). After some number of months or years, when sufficient stockpiles of those semi-processed building materials are available, a human crew (supported by various machines) could be sent to assemble those materials into buildings which, when assembled, would allow the work crews to live in them for weeks, months, or even indefinitely.

In addition, by creating competitions in which teams of science and engineering students at universities will design and build such prototype machines (preferably with support and teamwork from aerospace, automotive, and other companies that would like to build the actual machines), the design and the competitive testing of the prototypes could be done with maximum creativity and minimal costs.

As mentioned above, these types of machines are described in more detail in a utility patent application that is being filed simultaneously with this application (designated as utility application Ser. No. 10/692,058). The contents of that application are posted on the Internet, at www.tetraheed.net, and can be downloaded by anyone at no cost.

Accordingly, one object of this invention is to disclose a rocket lifting and launching system that uses a combination of (i) helium-filled lifting craft, and (ii) conventional propeller or jet engines, mounted on rotatable wings, to lift a rocket into the upper atmosphere, before the rocket's engines are ignited and the rocket is launched into space.

Another object of this invention is to disclose a rocket lifting and launching system that uses a combination of helium-filled lifting craft, and conventional propeller or jet engines mounted on rotatable wings, to provide a loaded rocket with substantial flying speed before the rocket's engines are ignited and the rocket is launched.

Another object of this invention is to disclose a rocket launching system that can slowly and gently lift a rocket into the upper atmosphere, in a manner that can be continuously monitored and controlled, by onboard pilots or by telemetry and remote controls, allowing the rocket engines to be ignited only after the rocket reaches a high altitude with substantial flying speed.

Another object of this invention is to disclose a rocket launching system that can improve the efficiency of rocket launches, to allow a rocket of a given size to lift a larger and/or heavier payload into orbit, and to allow a fully-loaded rocket (including payload) to place 10% or more of its total loaded weight into orbit, as a useful payload.

Another object of this invention is to disclose a rocket launching system that comprises several major lifting components that use well-known technology developed for subsonic aircraft, and which can be controllably descended and landed safely after launching a rocket, and which can be reused again very rapidly after refueling, in a manner comparable to conventional airplanes.

Another object of this invention is to disclose a rocket lifting and launching system that lifts rockets to a high altitude while they are suspended horizontally by a support system that distributes their weight over their entire length, thereby avoiding the high stresses and pressures that are generated within rockets that must stand and be launched in tall vertical columns.

Another object of this invention is to disclose a rocket lifting and launching system that is less violent, less warlike, and less potentially threatening and destructive than conventional rocket and missile systems, as a step toward improving international cooperation in designing and constructing permanent colonies on the moon, Mars, and elsewhere.

These and other objects and advantages of this invention will become more apparent through the following summary, drawings, and description.

SUMMARY OF THE INVENTION

A four-part system is disclosed for lifting a rocket into the upper atmosphere, and then establishing forward flight at a speed of several hundred miles per hour, before the rocket engines are ignited and the rocket is released from the lifting system. This system enables safer, less expensive, and more efficient launching of rockets and heavy payloads into space, using easily reusable subassemblies. The four main subassemblies of this system comprise, from the top down:

(1) an array of large helium-filled dirigibles, of a size that can provide hundreds or thousands of tons of vertical lifting force;

(2) a tank-holding assembly that will be tethered to the dirigibles, and that will contain pumps and high-pressure tanks, to recapture and store the helium for use in subsequent launches;

(3) a winged platform, with multiple wings that can be rotated into a vertical angle during liftoff, and into a horizontal angle to establish forward flight after a target altitude has been reached, and having at least conventional aircraft engines with oversized propellers on each wing; and, (4) a rocket, with a payload, suspended beneath the winged platform.

A similar three-part system is also disclosed, in which a single winged platform combines the features of the tank-holding assembly, and the winged platform. This type of system could use, for example, ejectable tank-and-pump modules that would be tethered to the dirigibles. At the proper time, these modules could be released by the winged platform, thereby releasing the dirigibles from the winged platform. The tank-and-pump modules would then be suspended beneath the dirigibles, and they would deflate the dirigibles by suctioning out the helium and storing it in the tanks, to a point where those units would descend to earth in a safe and controlled manner.

DETAILED DESCRIPTION

As summarized above, this invention discloses a system for using helium-filled vessels, and a platform with propeller engines on rotatable wings, to slowly lift a rocket to a high altitude (such as higher than 10,000 meters, or about 30,000 feet). This system is depicted as system 10, in FIG. 1. It can be regarded as having four main subassemblies, or layers. Each of these four main subassemblies is discussed below, under its own subheading.

Helium-Filled Vessels 100

The uppermost components of the system 10 shown in FIG. 1 comprise large helium-filled vessels 100.

These vessels can be referred to by any of several terms, including dirigibles, zeppelins, blimps, or balloons. Certain implications of these terms should be recognized, as a preface to using them properly and selecting a preferred term.

Balloon is the broadest term, since it includes any flexible bladder-type envelope or enclosure that can be filled with a liquid or gas. However, when applied to helium balloons, it tends to suggest the class of balloons that have round shapes with a single gondola suspended beneath them, of the types used by adventurers to try to circle the world. Those classes of helium balloons are not likely to be preferred for use as described herein, because they would generate high levels of unwanted drag when a rocket-lifting system is attempting to establish forward flying speed.

The term dirigible is the next broadest term, since it includes any type of lighter-than-air vessel that is elongated and steerable. This includes soft-fabric blimps, and hard-shelled zeppelins. However, "dirigible" is difficult and awkward to pronounce and spell, which makes it less than ideal, especially for an invention that is designed in part to promote international cooperation and supportive publicity.

Blimp refers to an elongated balloon (i.e.; a dirigible) with a flexible, non-rigid outer skin that will collapse if deflated. Originally, blimps were made of cloth fabric, impregnated with chemicals to make them more efficient at holding gas, and held together by strong belts that encircled and reinforced the fabric. Later, as Goodyear began using blimps to promote its rubber products, blimps were made of rubber, and today, they are mode of thin-walled high-tech polymers. It should also be recognized that "blimp" acquired a derogatory second meaning, referring to a person who is grossly overweight. Accordingly, "blimp" may or may not emerge as a preferred term for use herein.

The term zeppelin was named after a German who designed a safer type of dirigible, in the early 20th century. It had a fixed outer shape, and a plurality of separate gas compartments, so that if one compartment is torn or catches fire, the ship would have at least some chance of not crashing disastrously.

While "zeppelin" may emerge as the preferred term for the helium-filled devices disclosed herein (possibly in homage to the band Led Zeppelin, and its song "Stairway To Heaven"), it should be recognized that helium-filled lifters that are designed for use as disclosed herein preferably should not be designed to have fixed and unchangeable outer shells, which would add additional weight to these devices. Instead, they should be designed to allow controlled deflation, in a manner that will allow a number of semi-deflated helium-filled vessels 100, tethered to a tank holder 200, to descend rapidly but safely from the upper atmosphere, back to earth.

Presumably, this type of controlled deflation will lead to a controlled flattening of the outer surface in a manner that will create a dominant axis in either the vertical direction (comparable to an angel fish) or horizontal direction (comparable to a stingray or manta ray). During deflation, the alteration of the outer shape can be guided and controlled by mechanical devices that will elongate one set of internal "spines" inside the shell (such as the vertical spines), while shortening the "spines" that traverse the other direction (such as the horizontal spines). These types of synchronized elongating and shortening operations can be carried out by any of various known mechanisms, such as by using electric motors to rotate threaded shafts within threaded sleeves, or gears that drive rack-and-pinion systems, or by using pumps to control non-compressible fluids in elongated piston-and-cylinder systems. Alternately, frames that have hinged components, rather than or in addition to telescoping components, can be used to control a shape alteration, during deflation.

Since it is not yet clear whether a single preferred term will emerge to describe the helium-filled lifting vessels 100, or which term it should be, those vessels are referred to herein as simply "helium vessels" 100.

It should also be noted that hydrogen might alternately be used, as the gas that fills vessels 100. Although hydrogen poses a well-known risk for explosion, and therefore is generally not preferred for use in operations that involve any risk of fire or explosion, several offsetting factors should be recognized in the context of the disclosures herein. First, any hydrogen gas, if used in the lifting vessels 100, will be removed a substantial distance from the various types of machines that might pose a risk of ignition and explosion. Second, any hydrogen gas would be located above the machines that might pose a risk of ignition and explosion; therefore, since any leakage of hydrogen gas would promptly carry the hydrogen upward and away from those machines, this would further reduce the risk of accidental ignition. Third, hydrogen can be used as fuel, by burning it (using oxygen from the surrounding atmosphere) to create water; therefore, if hydrogen is used as a lifting gas in the system disclosed herein, it might offer a useful fuel source for one or-more items of machinery within the system. Fourth, hydrogen is vastly more abundant than helium, and can be obtained from limitless sources, including ocean water (by breaking apart water molecules, into hydrogen and oxygen). And fifth, because of density differences, hydrogen has about 10% more lifting power than helium, for a given volume. For all of these reasons, hydrogen as a potential lifting gas should not be dismissed out-of-hand. It can indeed provide a highly effective buoyant gas for vessels 100, and it should be considered and evaluated, as a potential lighter-than-air gas for those vessels. Accordingly, the description herein focuses on helium as the exemplary gas for filling vessels 100, but any such comments also apply to hydrogen in a generally interchangeable manner.

Similarly, the description presumes that vessels 100 should have elongated (i.e., dirigible-type) shapes, to provide maximum lifting capacity with minimal wind drag, to make them easier to handle during a launch and during descent. However, other types of enclosures, including the types of roughly spherical helium-filled balloons that recently have circled the earth non-stop, can also be evaluated for use as disclosed herein, if desired.

In one embodiment, as shown in FIG. 1, three helium vessels 100, aligned in parallel, are tethered (via numerous strong cables or chains 120) to the two sides and the middle of tank-holder 200. For purposes of illustration, the vessels 100 in FIG. 1 are shown as being roughly the same length as tank holder 200, the winged platform 300, and the rocket 400. However, for greater lifting power, the helium lifters 100 can be substantially longer than the other components of system 10. Zeppelins created in the 1930's were more than 800 feet long (for example, the Hindenburg, built in 1936, was 804 feet long, 135 feet in diameter), and could lift about 230 tons. Recently, a company called CargoLifter (a German company, www.cargolifter.de) built a prototype of a blimp called the CL160, which reportedly was 853 feet long and 213 feet in diameter, and held 19 million cubic feet of helium within a flexible multi-layer polymeric skin about 1/16 of an inch thick.

In the mid-1980's, it was estimated that a zeppelin with realistic commercial potential, created with materials available at that time, could lift a payload of about 400 tons. In view of the development of various types of improved technology since then, the upper load limit would be higher today. However, using 400 tons as a reasonable upper limit per vessel, an array of three dirigibles could contribute roughly 1200 tons of lifting capacity, which translates into 2.4 million pounds, which is about 1/3 of the total weight of a fully-loaded and fueled Saturn-V rocket with payload. In the claims below, vessels that can be filled with helium or hydrogen, and that have a lifting capacity of at least 100 tons, are referred to, as being the minimum level which is regarded as being genuinely useful and practical for actual launchings of heavy rockets.

When the lifting power of helium gas is being evaluated, several factors should be taken into account. First, the lifting power of helium is limited to the differential between the density of helium, and the density of air. If the weight of the balloon itself is ignored, a helium-filled balloon can lift about 13 kilograms (about 29 pounds) of dead weight, per 1000 cubic feet of helium. By contrast, liquids and solids are roughly 1000 times denser than gases, and a single cubic foot of water weighs about 62 pounds. Therefore, a cubic foot of water (or other materials with comparable densities) requires more than 2000 cubic feet of helium to lift it. In addition, it should also be kept in mind that the buoyant force of helium gas becomes less, at high altitudes, because of the reduced density of the surrounding air, at high altitudes.

Accordingly, even an array of three of the largest blimps or dirigibles ever created can lift only a fraction of the weight of a loaded Saturn-V rocket, and their lifting power will grow substantially less, as the system rises through the atmosphere, to thinner air. Therefore, additional lifting capacity must be provided.

One method for providing greater lifting force involves the use of cable or chain systems to create vertical "stacks" of two or even three or more layers of helium vessels. This can be done, without imposing additional stresses on the lower vessels, by using cables or chains that pass vertically and "cleanly" (i.e., without any gap or interruption in the cable or chain) through any lower vessels. If the internal frames of the lower dirigibles are coupled directly to the cables or chains, this will allow each helium-filled vessel to exert its lifting force directly on the cables or chains that pass through it, regardless of whether any other helium-filled vessels are also exerting additional lifting forces at other locations on the same cables or chains.

Accordingly, an array of six, nine, or even more helium lifters can be provided, using columns that are vertically offset from each other (to resemble a cross-section of a honeycomb), by placing additional sets of three vessels (in each layer) above the vessels shown in FIG. 1. Similarly, arrays of five or eight vessels can be provided, by omitting an uppermost center vessel.

The cables or chains can be made of any desired materials, including materials that have greater tensile strength than steel. Such materials include high-strength synthetic polymers, such as (for example) a class of compounds known as aramids, or polyaramids, in which aromatic (benzene) rings alternate with amide groups, in ways that allow parallel fibers to form regular crystalline structures that are held to each other by inter-chain hydrogen bonding. These types of flexible fibers are used in a material known as KEVLAR™, sold by DuPont, which is used in lightweight bulletproof vests, among other things. They are generally rated as being about 5 to about 20 times stronger than steel, on a per-weight basis. Recently, so-called "buckytubes" (also called carbon nanotubes) have been developed with even greater tensile strength. Those are just two examples of materials with high tensile strengths, and any currently-known or hereafter-discovered material that can provide high tensile strength can be evaluated for use in providing the cables or chains 120, as disclosed herein.

For still greater lifting capacity, and to increase the control and maneuverability of the resulting system, the lifting capacity of the helium-filled vessels should be supplemented by aircraft engines mounted on wings, as mentioned above and as described in more detail below.

During descent, the helium vessels 100 will be partially deflated, to enable descent. Presumably, they will remain partially deflated while being stored (such as in a hangar or inflatable fabric dome) between launching operations, to make them easier to maneuver and work with, and to reduce gradual helium seepage and small leaks out of the vessels.

The helium vessels 100 in FIG. 1 are shown as having tail fins 110, for improved steering and handling during a launch or descent. This is optional, and these fins also can be retractable if desired, since other steering mechanisms can be provided by other components of the system.

If desired, the dirigibles and/or the lifting platform can be provided with sails, spinnakers, or other large sheet-like devices that can be unreeled and deployed when desired, and then retracted after a rocket has been released. Such devices could help the system gain substantially-higher flying speeds, in the high-speed winds that are common in the upper atmosphere.

Tank-Holder 200

A device 200, referred to herein a tank holder, is suspended beneath the helium lifters 100, by means of numerous high-strength cables or chains 120, as mentioned above. The tank holder 200 will hold high-pressure tanks (which are not shown in FIG. 1, since they will be mounted to a frame, inside the aerodynamic surface material that covers the tank holder 200), gas compressors that can pump helium (referred to herein as pumps, for convenience) and a fuel supply for the pumps. Gas-carrying hoses will pass from the high-pressure tanks to the dirigibles 100.

Since the tank holder 200 will not be required to travel through the air at high speeds, it is presumed that it preferably should be shaped in a manner generally comparable to a wide barge, rather than a cylindrical airplane body. This shape can provide it an enlarged surface area, allowing its tension loads and stresses to be distributed over a wider area. It preferably should be provided with a tapered-edge or pointed nose and tail, to improve handling, steering, and forward flight during a launch, and during descent. As noted below, it generally should be provided with wings and engines of its own, both to provide greater lift, to improve its handling and maneuverability during a descent. It can also be provided with at tail fins, rudders or elevators, etc.

When a launch is almost ready to begin, helium will be pumped (or simply released, from the high pressure tanks) into the low-pressure helium vessels 100, until they are fully inflated. They will remain inflated until the entire system 10 (including the rocket 400) reaches a targeted altitude. At that time, the wings on winged platform 300 will be rotated at least partially forward, to begin flying the entire system forward. The system will not achieve a very high speed (i.e., relative to the surrounding wind speed, which can exceed 100 miles per hour at altitudes greater than 30,000 feet), as long as the helium vessels remain attached to the lifting system 10, since the large and bulky helium vessels will generate large amounts of air drag when pulled forward by engines.

At that time, the pumps will be used to partially deflate the dirigibles, by pumping the helium out of the helium vessels, through the hoses, and into the high-pressure tanks held by tank holder 200.

As mentioned above, in one preferred embodiment, the helium vessels 100 will not be fully deflated, and instead will be left with enough helium in them to provide buoyancy that will allow the vessels 100 and tank holder 200 to descend to earth slowly and gently (presumably to an ocean surface, where the units can be retrieved by one or more ships or barges).

However, alternate methods of controlled descent can also be used. In particular, rotatable wings with aircraft engines mounted on them (as shown by wings 310–322, mounted on winged platform 300 in FIGS. 1 and 2) can be affixed to the sides of tank holder 200. It is presumed that such wings generally should be provided on tank holder 200, both to provide greater lifting capacity, and to provide greatly improved maneuvering capacity during a controllable descent, and they are omitted from FIG. 1 solely to keep that drawing simpler and less cluttered. If rotatable wings with engines are provided on tank holder 200, they preferably should be offset (in imaginary vertical columns) as far as practical (without jeopardizing strength and structural integrity) from the wings and engines on the winged platform 300, to reduce turbulence, airflow competition or interference, and similar factors, between the different sets of wings and engines on the two different subassemblies 200 and 300, and to generate maximum lift for the overall system 10.

In general, the goal of the helium lifting system will be to raise the entire lifting and launch assembly 10 to a "maximum practical altitude". This presumably will be substantially higher than 20,000 feet, and in most cases is likely to be greater than 30,000 feet. However, the reduced buoyancy of helium gas, in the thin atmosphere that exists at high altitudes, may impose a lower maximum practical altitude for the helium-assisted portion of a launch, especially for exceptionally large and heavy rockets.

Winged Platform 300

The next lower subassembly, in system 10, is referred to herein as "winged platform" 300. It will have multiple rotatable wings, presumably in paired locations along each side of the platform, such as paired forward wings 310 and 312, and paired rear wings 320 and 322. Each wing will be provided with at least one and preferably two or more engines 330, of a type used in conventional airplanes, and preferably having propellers 332 that are relatively large, as used by Osprey tilt-wing aircraft, C17 cargo planes, etc. Four wings are shown on each side of platform 300, in the drawings, but other numbers can be used, if desired. In addition, engines on different wings can be offset from each other, in their distance from the side of platform 300, to reduce turbulence and increase fuel efficiency.

Unless modeling or testing data indicate otherwise, engines with large propellers are presumed to be preferable to turbine jets, to minimize any risks of fire, explosion, or increased fuel tank pressures that might be caused by unwanted heating of any rocket components or any fuel loaded therein, caused by hot exhaust gases that would emerge if jet engines are used. This presumption applies at least to those engine locations that are closest to the sides of the winged platform; and, since propeller engines provide better fuel efficiency than turbine jets, it is presumed that all of the engines on the winged platform generally should be propeller engines, rather than jets. However, the choice of any particular type of engine is not crucial to this invention, and any suitable engine that can generate large amounts of thrust can be selected. In addition, a combination of different engine types can be provided; in particular, a number of jet engines (including jet engines that are securely affixed, in a horizontal direction, to the fuselage of the winged platform 300) can be provided on winged platform 300, to boost the flying speed of the platform-and-rocket subassembly 20, shown in FIG. 2, after that subassembly has been released from the helium vessels 100 and tank holder 200.

After a maximum practical altitude (as discussed above) is reached for the helium-assisted portion of the launch, the rotatable wings 310–322 will be rotated at least partially forward, toward a slanted or horizontal position, causing the engines to begin pulling the system forward, in a desired direction that will align with the intended launch path of the rocket. When a desired speed is reached (which will be determined by a combination of factors that include the pulling force of the engines, the speed of the surrounding winds at that altitude, and the "air drag" created by the entire system, including the large helium vessels), the tank holder 200 will release the winged platform 300. This can be done by any suitable and reliable means. As one example, a number of heavy clamps 250, suspended from the tank holder 200, can be released from a number of clamping attachments 340, mounted on winged platform 300, by means of explosive bolts.

After this release, the winged platform 300 and the rocket 400 will begin flying the rocket forward at faster speeds. These speeds can reach several hundred miles per hour, using propeller engines only, or possibly greater speeds if jet engines are used.

The rotatable wings on should be able to rotate through a range of at least 60 to 70 and preferably about 90 degrees, from a vertical (or near vertical) orientation for use during lifting, to a horizontal (or nearly horizontal) orientation to provide forward flight speed after a desired altitude has been reached. It may be preferable to allow the wings to be rotated through a range of more than 90 degrees, so that the wings can be angled slightly downward during forward flight, by rotating them beyond a horizontal position; this could eliminate any risk of stalling as the heavy fully-loaded rocket pulls the flying platform downward, immediately after the lifting platform releases the flying platform and the rocket. If this type of slightly angled position is available, the wings might be more capable of helping the rocket gain a fairly high forward speed, by using a descending glide path.

The winged platform 300 is depicted in FIGS. 1 and 2 as a moderately wide and flat platform, with aerodynamic curves in its nose and tail sections. This design can allow its body structure to help generate lift and sustain altitude, after the platform and rocket subassembly 20 (shown in FIG. 2) has been released from the helium vessels 100 and tank holder 200. Depending on its size, it can be provided with any desired number and type of tail structures, shown in FIG. 2 as tailfins 370 and elevator 360, which generally should be provided with movable flaps, for maneuvering control.

Immediately before the rocket 400 is released, the winged platform can be maneuvered to raise the nose slightly, so that the rocket will begin its trajectory in an upward direction, to make optimal use of its fuel. If the tail fins cannot accomplish that by themselves, it can be done by rotating the forward wings 310 and 312 slightly toward the vertical direction.

It should also be noted that the winged platform 300 can be sufficiently large to carry a large load of rocket fuel, within its own internal tanks. This fuel can be pumped or otherwise loaded into the rocket 400, after the system has already reach a high altitude, and before the rocket is released. As just example, if liquid fuel is used having two components that will generate a controlled explosion when they are mixed together (such as kerosene and liquid oxygen, as used in the Saturn rockets in the Apollo launches), the winged platform 300 can carry all or part of one of those two components, to keep the rocket tank pressures at safer levels until they are pressured up just before ignition, and to reduce any risk of explosion due to premature or accidental mixing of the two components before the rocket engine is scheduled to be ignited.

It should also be recognized that the arrangement disclosed herein may provide a relatively safe way for a set of pilots and space crew to delay climbing into the rocket, until everything has been checked out, and to be protected (to the extent possible) from major rocket malfunctions, if they do occur. As one example, if pilots and a crew ride in a sealed and pressurized cabin, near the front of the tank holder 200, the winged platform 300 would function as a shield, between them and the rocket 400, which would cushion them from the force of an explosion by the rocket. The shielding effect can be further enhanced by providing both the tank holder 200, and the winged platform 300, with sharply angled and even armored lower surfaces, thereby creating wedge-shaped structures that would deflect the force of a major explosion toward the sides of the wedge, in outward horizontal directions that would deflect, dissipate, and minimize any destructive vertical concussion.

In addition, although the clamping mechanisms 350 (which suspend the winged platform 300 from the tank holder 200) must be able to withstand very high loads, in tension, they do not need to withstand high compressive loads. Therefore, those clamping mechanisms can be designed to contain multiple large and powerful shock absorbers (comparable to the shock absorbers on the wheels of the largest airplanes, but with longer lengths, which would allow them to be even more effective), to further dampen and reduce any destructive concussions caused by a rocket explosion.

Rocket 400

As shown in FIGS. 1 and 2, a rocket 400 is suspended horizontally beneath the winged platform 300. Rocket 400 will contain a payload of any desired type, either manned or unmanned, and it can have any desired number of stages. It can be provided with either fixed or retractable steering, landing, or other fins or wings, with fixed or retractable side-mounted engines (which may be rocket engines, for use in the vacuum of space, or jet engines, for use in the atmosphere of earth or possibly Mars), or with any other type of appurtenance (such as retractable wheels, for controlled landings). It also can have an external structure with any desired shape or configuration, including a conventional cylindrical rocket, a multi-cylinder assembly with side-mounted fuel tanks and/or engines that can be jettisoned when empty, a winged-type Space Shuttle or variant thereof, etc.

Sequence of Launch Steps

The following description of sequential steps in a launching operation are intended merely as illustrative and exemplary, rather than limiting. Various modifications and alternatives can be developed by those skilled in the art, depending on factors such as the type, size, and weight of the rocket that is used, whether it has a manned capsule and/or an unmanned payload, whether a piloting crew will be aboard the tank holder 200 or the winged platform 300, and whether the complete load of rocket fuel will be loaded into the rocket before liftoff, or whether some or all of the rocket fuel will be carried up in the winged platform 300, for mid-air loading into the rocket.

Presumably, to reduce risks to onshore facilities and people, launch operations as described herein will be carried out at either (i) a coastal site, such as Cape Canaveral, Fla. (where the Kennedy Space Center is already located), where the prevailing winds will quickly carry the system out over the ocean in case of an aborted launch or major accident, or (ii) a sparsely populated site, as used in the past by various nations such as Russia and China.

Before a launch begins, a loaded rocket 400 will be suspended beneath a winged platform 300, using any suitable types or combinations of struts, girders, clamps, belts, or other suspension devices that will allow detachment and release of the rocket after the system reaches its target altitude. Preferred forms of detachable devices that will not jam, even when subjected to very high loads, are likely to use mechanisms such as explosive bolts.

The term "loaded rocket" implies that a load of rocket fuel has been loaded into the rocket, and that the payload is mounted at or near the forward end of the rocket. However, other arrangements can be used if desired. For example, as noted above, a portion of the rocket fuel (such as one fuel component that will cause a second fuel component to become explosive upon mixing) might be stored in the tank holder 200 or the winged platform 300, during the initial stages of a launch. Similarly, if a manned crew will be lifted into space by the rocket, that crew might remain in the tank holder 200 or winged platform 300 during the initial stages of a launch, and climb down into the capsule or shuttle only after the rocket has reached a certain altitude or flying speed.

When the entire system 10 is ready for assembly, the helium vessels 100 will be partially inflated, and moved into position (using tether cables attached to heavy vehicles or other devices) directly above a tank platform 200. They will be securely coupled to the tank holder 200, and then they will lift the tank holder 200 to a suitable height, using additional inflation with helium along with the adjustable ground tethers. This subassembly will then be raised somewhat higher, allowing it to be positioned over a winged platform 300, which can be rolled into position beneath the assembly as it grows taller. When all three of those main subassemblies are ready, they are allowed to raise higher by adding helium and extending the ground tethers, and rocket that is lying horizontally on a supporting tractor or other carrier can be rolled into position beneath them. The rocket can be in one complete assembly, or it can be rolled into position in segments or stages, and then assembled and secured beneath the winged platform 300.

The system is then thoroughly checked out, to make sure all clamps, cables, hoses, explosive bolts, and other systems and fittings are secure and ready to function.

If desired, the system also can be rotated horizontally at any stage of the assembly (including immediately after liftoff, after the rocket has risen only a few feet, while the system remains tethered to the ground), to turn either the nose or the tail of the system into any breezes or winds that are present.

After a pre-liftoff checkout has been completed, all rotatable wings are turned to a vertical orientation, and the engines will be started, idled, and checked out. During this stage, the propellers will be rotating horizontally, about vertical axes, in a manner comparable to helicopter rotors. When everything is ready, the propellers will be accelerated to lifting power and speed, and the ground tethers preferably should be lengthened (presumably to a height such as several dozen feet) while the system rises in the air, so that the lifting system can receive a final checkout.

When the tethers are finally released, the entire system will begin to rise into the atmosphere, lifted by both the helium vessels and the propellers. Initial liftoff should proceed fairly slowly, with no major forces imposed on the system due to rapid acceleration, and with no horizontal motion other than drift caused by gentle to moderate breezes.

Initial lifting will continue in an essentially vertical direction (with wind drift providing the only horizontal motion) until the entire system reaches a maximum practical altitude, which will occur when the buoyancy of the helium (which will decrease, as the surrounding air grows thinner and lighter) drops below levels that can provide effective lifting forces.

When this altitude is approached or reached, the rotatable wings will be rotated slowly and gradually toward a forward direction, until a moderate degree of forward motion is established. That forward motion will be constrained and limited by the bulk and drag of the large and bulky helium vessels 100. To reduce their drag, vessels 100 can be partially deflated, at a rate that will be controlled by the pumps carried within tank holder 200. Those pumps will suction helium out of the vessels 100, and will pump it into the high-pressure tanks. As the dirigibles shrink in size, their internal skeletons will cause them to deflate and flatten in a controlled manner, such as into horizontally flattened cross-sections (comparable to stingrays, manta rays, etc.), or into narrower vertical cross-sections (comparable to angel fish). This will reduce their drag, and allow higher flying speeds in the thin upper atmosphere. This deflation will allow the prop engines to be rotated into a more horizontal direction, to generate more speed before the winged platform 300 and rocket 400 are detached and released from the tank holder 200.

When a desired (but moderately low) forward speed is reached, the tank holder 200 will release the winged platform 300. The pumps will then continue to deflate the helium vessels 100, until that subassembly begins to gradually float back down to earth, where it will be retrieved and reused. As mentioned above, the tank holder 200 preferably should be provided with wings and propellers of its own, for maneuvering and control during descent. It can also be provided with tethering cables that can be unreeled, as it approaches the ground, to facilitate recovery and securing, followed by low-altitude transportation back to the base, using ground vehicles and/or floating vessels. If wings, tail fins, or other suitable structures are provided, it may be possible to allow the tank holder platform to be flown down and landed on a conventional runway or large field, or landed (which likely will include a reeling-in operation, using cables) directly on top of an ocean-going barge.

If desired, means also can be provided to allow any or all of the helium vessels 100 to be released from the tank holder 200, during descent, so that the helium vessels 100 can be landed, recovered, and transported separately. As one example of how this could be performed, the center helium vessel, or the outside or "flanking" vessels, could be released from the tank holder 200, once the system begins to pick up forward flying speed. This would allow the system to begin flying forward at higher speeds, thereby generating more lift due to the wings, and the resulting increased flying speed may facilitate rotation of the wings to a fully horizontal position, without risk of stalling.

The hoses, pumps, and tanks to which the released vessels are attached would also be released and ejected by the tank holder, and would remain attached to a still-inflated helium vessel that would be floating freely. Those hoses, pumps, and tanks would enabled continued deflation of the vessel, and they would also function as ballast weights, to help ensure gradual and proper descent of the helium vessel, to the earth. The helium vessel(s) that remain(s) attached to the tank holder 200 throughout the entire launching procedure would enable a slow, gentle, and controlled descent of the tank holder 200, after the tank holder 200 has released the winged platform 300 and the rocket 400.

After the winged platform and the rocket have been fully released from the tank holder, they will form a new and smaller subassembly 20, as shown in FIG. 2, which will be able to fly at substantially greater forward speeds. These speeds will remain below the speed of sound, if propeller-only engines are used, and it is presumed that subsystem 20 should remain at subsonic speeds for as long as the winged platform 300 remains coupled to the rocket 400, to reduce any risks that might arise if both units, flying parallel and close together, teach the sound barrier and cause a sonic boom. Nevertheless, if fixed and horizontally mounted jet engines are mounted on the fuselage of the winged platform 300, subunit 20 may be able to reach flying speeds that approach the speed of sound.

When a suitable forward speed has been reached or approached, any rocket fuel that has not already been loaded into the rocket tanks and any crew, passengers, or payload that rode up in a different component, should be transferred to the rocket. The rocket engine will be ignited, and the rocket will begin burning its fuel, which has been completely conserved up to that point. Once the rocket engine is ignited (which presumably should involve a brief low-power burn, which can be controlled by the pumps that feed the rocket fuel to the engines, rather than creating immediate full power), the rocket will remain coupled to the lifting platform for only a brief period, while the rocket is checked out and cleared for release.

As soon as clearance is granted, the winged platform preferably should raise its nose slightly, to get the rocket pointed upward, and the rocket (carrying its payload) will be released. Once it begins flying under its own power, unfettered and with the full thrust of the rocket engine driving it, it will quickly reach a much greater speed. Its trajectory will be directed upward, toward outer space.

As soon as it has released the rocket, the winged platform 300 should turn sharply, to minimize any risks of a collision or debris in case the rocket malfunctions or explodes. It will descend separately, flying in essentially the same way that a large cargo plane flies, and can land directly on a runway.

Modified and Consolidated Variants

As mentioned briefly above, it may be possible to use a single subassembly that can both (i) hold high-pressure helium tanks and pumps, which will interact with the helium vessels 100 to deflate them at the proper time, and which will be ejected when the helium vessels 100 are released, so that they will remain tethered to, and suspended from, the helium vessels as they descend to earth; and, (ii) have rotatable wings mounted on both sides, so that it can serve as the winged platform.

This system, while feasible, would need careful planning and evaluation, and it is presumed herein that the best approach would be to build and test a complete four-part system first, and establish actual operating experience with it, before attempting to consolidate the structures and functions of both tank holder 200, and winged platform 300, into a single unit.

Similarly, it is possible to create a lifting-and-launching system as disclosed herein, in which a rocket is lifted to a high altitude, and then simply launched from that altitude, without establishing any substantial forward speed other than the surrounding wind speed. This is indeed feasible, and at least some of the claims are intended to cover that approach. However, it must be recognized that conventional aircraft engines (which use air, from the atmosphere, to generate forward power, thrust, and speed) are much more fuel-efficient than rocket engines, which generate a controlled explosion and then use nothing more than the momentum of the expelled fuel, in one direction, to drive the vessel in the opposite direction. Accordingly, the use of conventional aircraft engines (using either propellers or jets) to establish a substantial forward flying speed, while the craft remains surrounded by sufficient air to properly operate an aircraft engine, offers a much better and more efficient way to conserve and use rocket fuel, and will allow larger and heavier payloads to be lifted into orbit, more efficiently and less expensively.

Advantages and Conclusions

As noted above, near the end of the Background section and before the Summary of the Invention, this system can provide a number of potentially very useful and important features and advantages over conventional rocket launches using ground launch pads. Those features and advantages will not be repeated here; however, since they described features and advantages of this method of launching rockets, rather than merely summaries of background art or unsolved problems, any readers who skipped that portion of the Background section can return to it, for a description of those features and advantages.

This lifting-and-launching system may be ideal for launching heavy payloads, such as (i) full fuel tanks that can be placed in orbit around earth or the moon, for refueling of other rockets in space; (ii) large structural components, for a space station, lunar base or colony, or Mars base or colony; and (iii) major subassemblies and/or loaded fuel tanks for large multi-part rockets with manned capsules, which can be assembled in space in a manner that will allow much faster travel to Mars or other planets than can be achieved by rockets that must lift off from earth.

In addition, if this system is able to establish a record of reliable safety, it may also be able to provide a major advance toward commercial space flight, for entities such as: (i) private companies that want to launch satellites, research facilities, or other equipment; (ii) people of moderate wealth, who would like to be able to go into space at least once in their life; and, (iii) political, religious, military, and other leaders, including leaders of quarreling or warring nations, religions, or armies, who might be coaxed by a trip into space into a better realization that the problems that divide their nations must be understood and dealt with in a larger context of the responsibilities that all leaders must bear toward the planet and toward all humanity.

Thus, there has been shown and described a new and useful system and method for lifting loaded rockets high into the atmosphere, and then launching them into flight, in a manner that conserves rocket fuel, allows for more efficient launching of heavy payloads, and allows the lifting system to be rapidly reusable. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention.

The invention claimed is:

1. A lifting system, designed and suited for lifting a rocket having at least one rocket engine to atmospheric heights before said rocket engine is ignited, comprising:
   a. at least one inflatable buoyant vessel designed to be filled with helium or hydrogen;
   b. a liftable tank-holding subassembly, comprising at least one pressurized tank suited for holding helium or hydrogen, and at least one pump or compressor coupled to at least one hose, said pump and hose being capable of partially deflating at least one inflatable buoyant vessel, with means for coupling said tank-holding subassembly to at least one inflatable buoyant vessel;
   c. at least one winged aircraft, having at least two rotatable wings affixed to opposed sides of said winged aircraft and having at least one aircraft engine mounted to each of said rotatable wings and capable of generating upward thrust when the rotatable wings are positioned vertically, and forward thrust when the rotatable wings are positioned horizontally;
   d. means for suspending said winged aircraft beneath said tank-holding subassembly and for releasing said winged aircraft from said tank-holding subassembly;
   e. means for both (i) suspending a rocket from the lifting system, thereby allowing the rocket to be lifted into the atmosphere by the lifting system, and (ii) releasing the rocket from the lifting system, once the lifting system and the rocket have reached a suitable altitude during a launching operation.

2. A lifting system of claim 1, comprising:
   a. an array of dirigibles;
   b. a tank-holding component which holds at least one tank that can contain pressurized gas;
   c. a winged aircraft having at least two aircraft engines mounted on each of at least two rotatable wings; and,
   d. means for both (i) suspending a rocket from the winged aircraft, (ii) releasing the rocket from the winged aircraft, once the lifting system and rocket have reached a suitable altitude during a launching operation.

3. A method of lifting a rocket and launching it from an elevated altitude, comprising the following steps:
   a. suspending a rocket from a winged aircraft having at least two rotatable wings with at least one conventional aircraft engine mounted to each rotatable wing, wherein the winged aircraft is suspended beneath at least one inflatable buoyant vessel that is designed to be filled with helium or hydrogen;
   b. rotating the rotatable wings into a vertical position;
   c. using lifting power provided by the winged flightworthy structure with its wings and engines, and by the inflatable buoyant vessel, to lift the rocket to an elevated altitude, prior to igniting the rocket engine; and,
   d. releasing the rocket from the winged aircraft.

4. The method of claim 3, wherein the winged aircraft is used to establish a forward flying speed before the rocket is released.

5. The lifting system of claim 1, wherein at least one inflatable buoyant vessel is provided with internal frame components that enable controlled deflation of said buoyant vessel, in a manner that will establish an altered external shape for said inflatable buoyant vessel, to facilitate controlled descent of said inflatable buoyant vessel after a winged aircraft and a rocket suspended beneath said winged aircraft have been released from said inflatable buoyant vessel.

6. The lifting system of claim 1, wherein means are provided for releasing said winged aircraft from said liftable subassembly comprising a pressurized tank for holding helium or hydrogen, after said lifting system has reached a suitable altitude during a launching operation and while a rocket remains suspended beneath said winged aircraft.

* * * * *